(12) United States Patent
Kikuchi et al.

(10) Patent No.: US 8,903,957 B2
(45) Date of Patent: Dec. 2, 2014

(54) COMMUNICATION SYSTEM, INFORMATION TERMINAL, COMMUNICATION METHOD AND RECORDING MEDIUM

(71) Applicant: Casio Computer Co., Ltd., Tokyo (JP)

(72) Inventors: Masaaki Kikuchi, Fussa (JP); Nobuo Iizuka, Hamura (JP); Keiichi Kaneko, Kawasaki (JP); Takeshi Imai, Hamura (JP)

(73) Assignee: Casio Computer Co., Ltd., Tokyo (JP)

( * ) Notice: Subject to any disclaimer, the term of this patent is extended or adjusted under 35 U.S.C. 154(b) by 59 days.

(21) Appl. No.: 13/868,040

(22) Filed: Apr. 22, 2013

(65) Prior Publication Data

US 2013/0290490 A1 Oct. 31, 2013

(30) Foreign Application Priority Data

Apr. 25, 2012 (JP) ................... 2012-100481

(51) Int. Cl.
*G06F 15/16* (2006.01)

(52) U.S. Cl.
USPC ........ 709/219; 348/14.08; 348/601; 345/157; 382/103; 396/310

(58) Field of Classification Search
USPC ........ 348/14.08, 159, 158; 345/419; 382/103; 396/310; 709/217
See application file for complete search history.

(56) References Cited

U.S. PATENT DOCUMENTS 8,611,601 B2 * 12/2013 Calman et al. ............... 382/103
2003/0058353 A1 3/2003 Tsue
2004/0046779 A1 * 3/2004 Asano et al. ............... 345/716
2006/0007311 A1 * 1/2006 Watanabe ................. 348/158
2006/0218627 A1 9/2006 Komatsu (Continued)

FOREIGN PATENT DOCUMENTS

JP 63-256061 A 10/1988
JP 01-221064 A 9/1989

(Continued)

OTHER PUBLICATIONS

Japanese Office Action dated Aug. 20, 2013 (and English translation thereof) issued in counterpart Japanese Application No. 2012-100481.

(Continued)

*Primary Examiner* — Dustin Nguyen
(74) *Attorney, Agent, or Firm* — Holtz, Holtz, Goodman & Chick PC

(57) ABSTRACT

A transmission-side information terminal displays a marker whose wavelength changes with time on the basis of a tag ID acquired from a management server. A receiving-side information terminal takes an image to acquire the tag ID, and transmits storage instruction information to a distribution server, the storage instruction information including the tag ID, an area number indicating a position of the receiving-side information terminal and image data acquired by taking an image. The image distribution server stores the tag ID, the area number and the image data in the storage instruction information in association with one another. The transmission-side information terminal transmits query information including the tag ID acquired from the management server and the area number indicating its own position to the image distribution server, thereby acquiring image data associated with the tag ID and the area number from the image distribution server.

11 Claims, 8 Drawing Sheets

(56) References Cited

U.S. PATENT DOCUMENTS

| | | | |
|---|---|---|---|
| 2007/0200922 A1* | 8/2007 | Ueno et al. | 348/14.08 |
| 2008/0112701 A1* | 5/2008 | Shibasaki et al. | 396/310 |
| 2010/0292003 A1* | 11/2010 | Kim | 463/31 |
| 2012/0056992 A1* | 3/2012 | Kuroda | 348/46 |
| 2012/0218257 A1* | 8/2012 | Hisano | 345/419 |

FOREIGN PATENT DOCUMENTS

| JP | 11-298775 A | 10/1999 |
|---|---|---|
| JP | 2003-110975 A | 4/2003 |
| JP | 2003-209729 A | 7/2003 |
| JP | 2003-209824 A | 7/2003 |
| JP | 2006-268689 A | 10/2006 |
| JP | 2007-156813 A | 6/2007 |
| JP | 2008-098832 A | 4/2008 |
| JP | 2010-114842 A | 5/2010 |
| JP | 2011-009898 A | 1/2011 |

OTHER PUBLICATIONS

Japanese Notice of Allowance dated Nov. 12, 2013 issued in counterpart Japanese Application No. 2012-100481.

* cited by examiner

FIG. 1
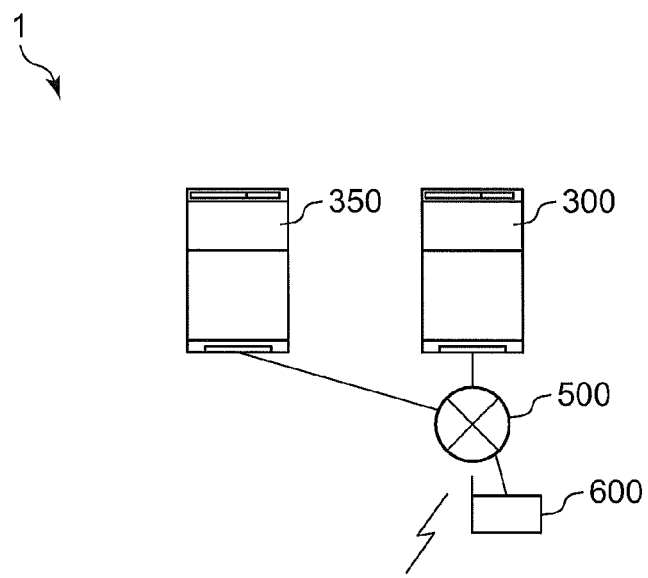
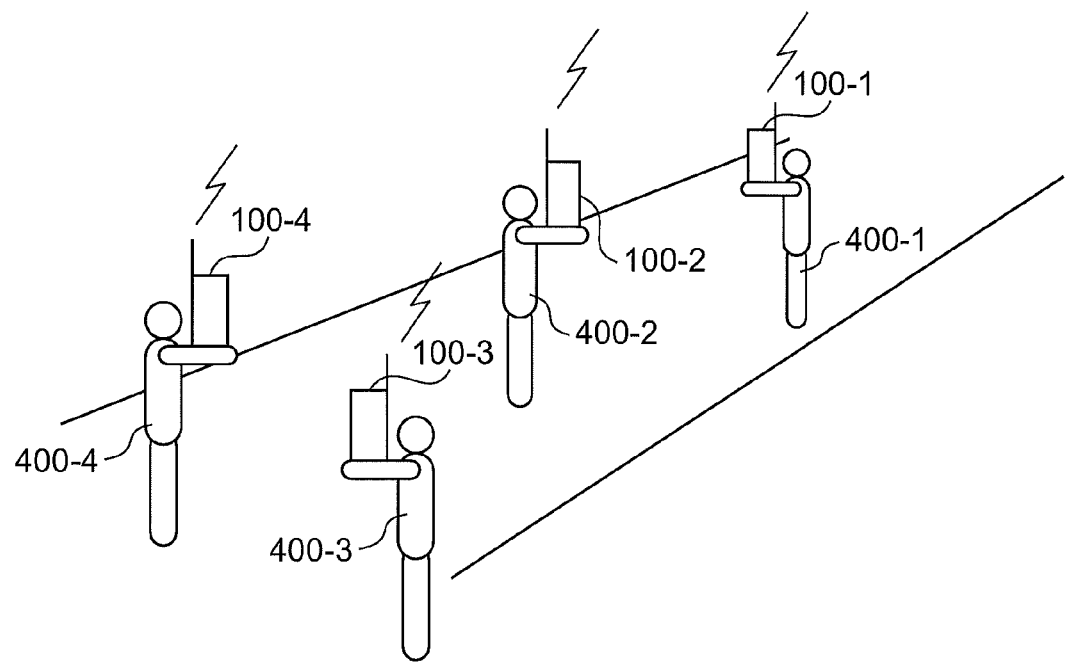

| TAG ID | AREA NUMBER | CONTENT | | IMAGING CONTROL CODE |
|---|---|---|---|---|
| | | IMAGE | MESSAGE | |
| 0 | 10001 | Aaa.png | Hello | — |
| 11 | 10232 | Bbb.png | hahaha | ab@aaa.co.jp |
| 3 | 20021 | Ccc.png | Oh! | autoShutterdelete |
| 12 | 10001 | Ddd.png | Happy | — |

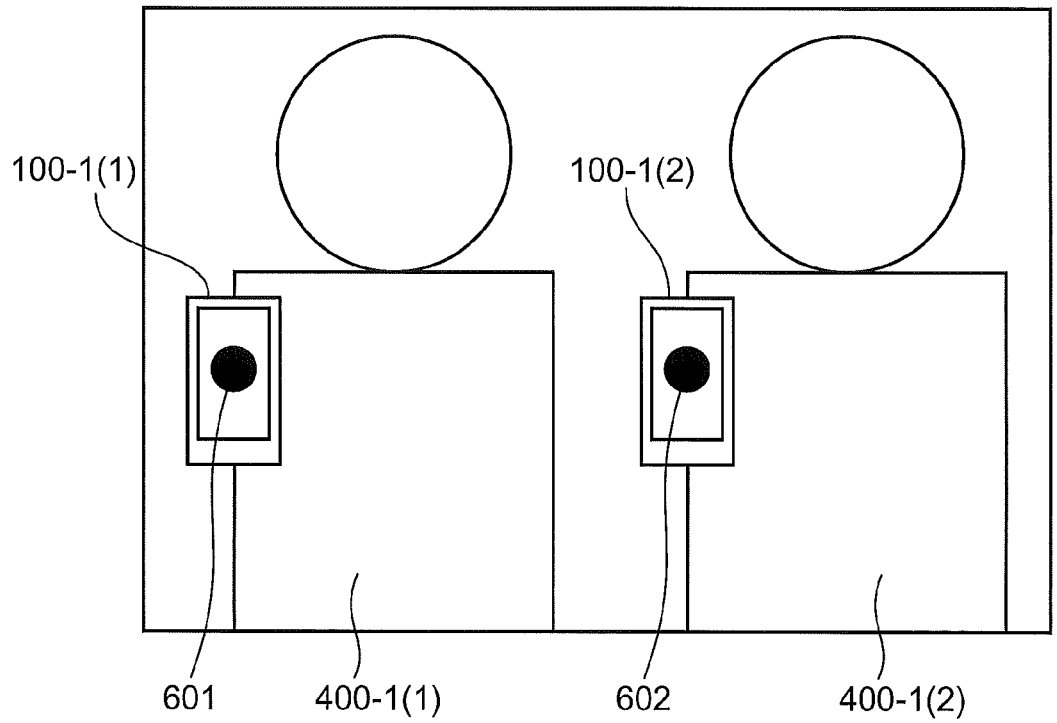

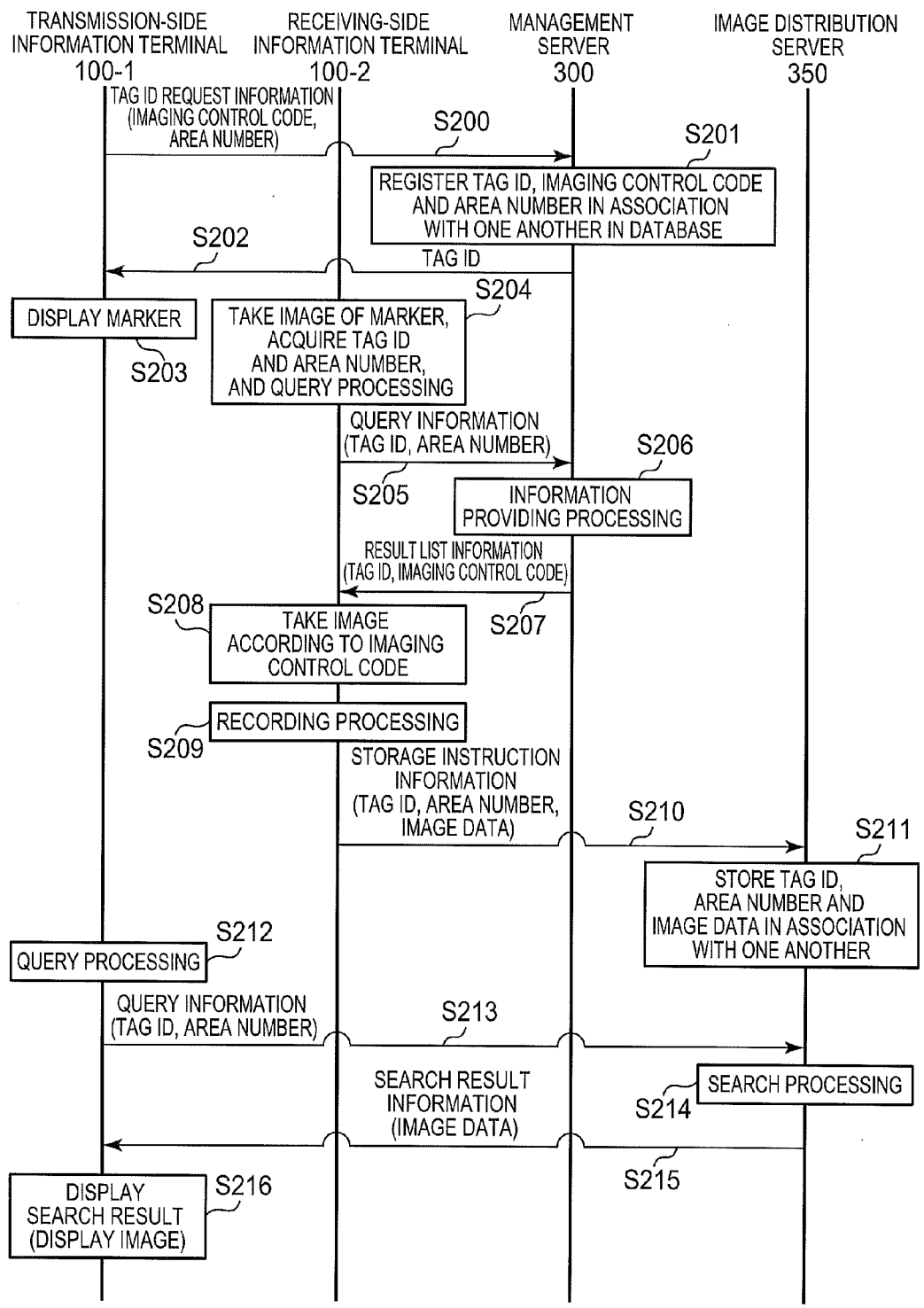

_US 8,903,957 B2_

COMMUNICATION SYSTEM, INFORMATION TERMINAL, COMMUNICATION METHOD AND RECORDING MEDIUM

CROSS-REFERENCE TO RELATED APPLICATION

This application claims the benefit of Japanese Patent Application No. 2012-100481, filed on Apr. 25, 2012, the entire disclosures of which are incorporated by reference herein.

FIELD

The present invention relates to a communication system, an information terminal, a communication method and a recording medium.

BACKGROUND

Conventionally, easier and more reliable distribution methods have been devised for distributing a group photograph to persons included in the group photograph.

For example, in Unexamined Japanese Patent Application Kokai Publication No. 2011-009898, an imaging device uses a proximity wireless communication infrastructure to transmit unique identification information to around the imaging device. Communication terminals around the imaging device, including communication terminals of persons to be included in a group photograph receives the identification information from the imaging device. After that, the imaging device takes a group photograph, and transmits the taken group photograph with the unique identification information to a server.

Meanwhile, a person that is around this imaging device and included in the taken group photograph uses his/her communication terminal to transmit the unique ID received from the imaging device to the server.

To the server is previously registered facial information of owners of communication terminals. The server identifies facial information included in the group photograph transmitted from the imaging device, and transmits the taken group photograph to a communication terminal that is associated with the identified facial information and has transmitted the unique ID.

However, in the above conventional art, at least a clear facial image must be taken. In the case of a group photograph in which faces are unclear, it is difficult to reliably distribute the group photograph to each member.

The present invention was made in view of such a problem, and has an objective to enable an image to be distributed more easily and reliably.

SUMMARY

In order to achieve the above objective, a communication system according to a first aspect of the present invention includes:

a first information terminal that is configured to access a server and a second information terminal, the server being on an external network and data storing position in the server being identified by definition information defining time-series change of a marker, the first information terminal comprising:

a first definition information acquirer configured to acquire the definition information from the server that manages the definition information;

a setter configured to set the marker on the basis of the definition information acquired by the first definition information acquirer; and an output device configured to output the marker that was set by the setter and changes with time, the second information terminal comprising:

an imager;

a second definition information acquirer configured to acquire the definition information by causing the imager to sequentially take an image that includes the marker outputted from the output device in the taken image; and a transmitter configured to transmit image data in which the marker is included in the taken image to an address identified by the definition information acquired by the second definition information acquirer.

In order to achieve the above objective, an information terminal according to a second aspect of the present invention accesses information resource that is on an external network and whose data storing position is defined by definition information that defines time-series change of a marker, and includes:

an imager;

a definition information acquirer configured to acquire the definition information from the information resource by causing the imager to sequentially take an image that includes the marker outputted from an external output device in the taken image; and a transmitter configured to transmit image data in which the marker is included in the taken image to an address identified by the definition information acquired by the definition information acquirer.

In order to achieve the above objective, a communication method according to a third aspect of the present invention is for a communication system that includes a first information terminal that is configured to access a server and a second information terminal, the server being on an external network, a data storing position in the server being identified by definition information defining time-series change of a marker, the method includes:

a first definition information acquisition step at which the first information terminal acquires the definition information from the server that manages the definition information;

a setting step at which the first information terminal sets the marker on the basis of the definition information acquired at the first definition information acquisition step;

an output step at which the first information terminal outputs the marker that is set at the setting step and changes with time;

a second definition information acquisition step at which the second information terminal acquires the definition information defining time-series change by causing an imager to sequentially take an image that includes the marker outputted at the output step in the taken image; and a transmission step at which the second information terminal transmits image data in which the marker is included in the taken image to an address identified by the definition information acquired at the second definition information acquisition step.

In order to achieve the above objective, a communication method according to a fourth aspect of the present invention is for an information terminal that accesses information resource that is on an external network and whose data storing position is identified by definition information defining time-series change of a marker, and the method includes:

a definition information acquisition step to acquire the definition information by causing an imager to sequentially take an image that includes the marker outputted from an external output device in the taken image; and a transmission step at which the information terminal transmits image data in which the marker is included in the taken image to an address identified by the definition information acquired at the definition information acquisition step.

In order to achieve the above objective, a recording medium according to a fifth aspect of the present invention stores a program to cause a computer of an information terminal that has an imager to function as:

a definition information acquirer configured to acquire definition information defining time-series change of the marker by causing the imager to sequentially take an image that includes the marker outputted by another computer in the taken image; and a transmitter configured to transmit image data in which the marker is included in the taken image to an address identified by the definition information acquired by the definition information acquirer.

BRIEF DESCRIPTION OF THE DRAWINGS

A more complete understanding of this application can be obtained when the following detailed description is considered in conjunction with the following drawings, in which:

FIG. 1 is a diagram illustrating one example of arrangement of an information terminal, a management server and an image distribution server that form a communication system according to a first embodiment;

FIG. 8 is a diagram illustrating one example of an image taken by a receiving-side information terminal according to the first embodiment;

FIG. 9 is a diagram illustrating one example of database in an image distribution server according to the first embodiment;

FIG. 11 is a flow chart illustrating one example of operation according to a second embodiment.

DETAILED DESCRIPTION

First Embodiment

Figure 2:
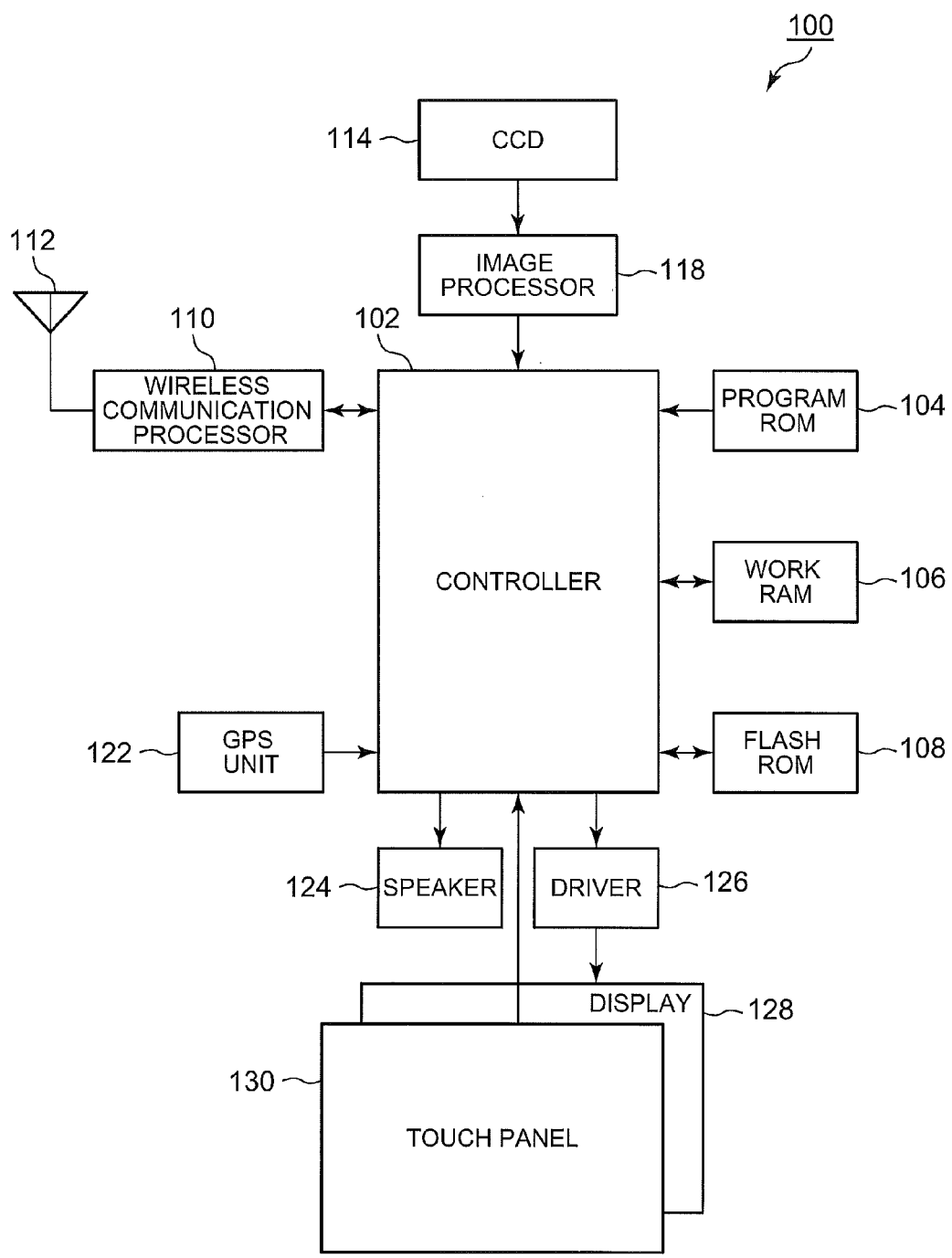
FIG. 2 is a diagram illustrating one example of configuration of an information terminal according to the first embodiment.

Hereinafter, a communication system 1 according to a first embodiment of the present invention will be described with reference to drawings.

As illustrated in FIG. 1, the communication system 1 includes information terminals 100 (100-1, 100-2, 100-3, 100-4 in FIG. 1), a management server 300, and an image distribution server 350.

The information terminals 100, management server 300 and image distribution server 350 communicate with each other via a communication network 500 and a wireless base station 600.

Each information terminal 100 is specifically a terminal that is portable and has a wireless communication function, such as a mobile phone, a smartphone, a tablet-type personal computer, a laptop personal computer or the like.

An information terminal 100-1 is owned by a user 400-1. An information terminal 100-2 is owned by a user 400-2. An information terminal 100-3 is owned by a user 400-3. An information terminal 100-4 is owned by a user 400-4.

Each information terminal 100 transmit tag ID request information for requesting transmission of a tag ID to the management server 300.

The tag ID is information that identifies an after-mentioned image data storing position, and defines time-series color change of a marker that is an image.

The color change is change of parameters that identifies color, such as wavelength, hue and brightness. In the present embodiment, time-series change of at least one of wavelength, hue and brightness is defined by the tag ID.

The tag ID request information includes content and area number indicating position of each information terminal 100.

The content is each user 400's profile data, a text message, a picture, an image by computer graphics (CG), and/or the like that each information terminal 100 transmits to the management server 300 in response to operation of the user 400.

Area number is used in roughly identifying a location on the earth. The entire earth is previously segmented into a plurality of areas, and unique identification information provided to each area is area number.

On receiving tag ID request information, the management server 300 transmits the tag ID to the information terminal 100 that transmitted the tag ID request information.

The management server 300 stores and manages content that are included in the received tag ID request information, the area number, and the transmitted tag ID in association with each other.

The information terminal 100 receives the tag ID from the management server 300.

Hereinafter, an information terminal 100 that has received the tag ID from the management server 300 is called "transmission-side information terminal", if appropriate.

A transmission-side information terminal 100 displays, as a marker, an image in which wavelength changes with time on the basis of the tag ID. The transmission-side information terminal 100 is able to transmit the tag ID to another information terminal 100 by displaying this marker.

The other information terminal 100 takes successively an image of light of the marker displayed by the transmission-side information terminal 100 and decodes the taken image to acquire the tag ID from the transmission-side information terminal 100.

If the other information terminal 100 takes successively images of lights of a plurality of markers displayed by a plurality of transmission-side information terminals 100, the other information terminal 100 can acquire a plurality of tag IDs.

Hereinafter, an information terminal 100 that has acquired the tag ID from the transmission-side information terminal 100 is called "a receiving-side information terminal", if appropriate.

Further, a receiving-side information terminal 100 transmits query information to the management server 300, the query information including the tag ID acquired by taking and decoding an image and the area number indicating position of the receiving-side information terminal 100.

On receiving the query information, the management server 300 transmits content associated with the tag ID and the area number that are included in the query information to the receiving-side information terminal 100.

On receiving the content, the receiving-side information terminal 100 combines (superimposes) an image of the content on the position of the marker in the taken image, displays the resulting synthetic image, and stores image data of the synthetic image.

Further, the receiving-side information terminal 100 transmits storage instruction information to the image distribution server 350, the storage instruction information including the tag ID acquired from the transmission-side information terminal 100, the area number indicating a position of the receiving-side information terminal 100 and the image data of the synthetic image.

The image distribution server 350 stores the tag ID, the area number and the image data that are included in the received storage instruction information in association with one another.

After that, the transmission-side information terminal 100 transmits query information to the image distribution server 350, the query information including the tag ID received from the management server 300 and the area number indicating the position of the transmission-side information terminal 100.

The image distribution server 350 performs search processing with the use of the tag ID and area number that are included in the received query information as a key to acquire the image data associated with the tag ID and the area number.

Further, the image distribution server 350 transmits search result information including the acquired image data to the transmission-side information terminal 100.

The transmission-side information terminal 100 displays the image data included in the received search result information. In this way, the transmission-side information terminal 100 is able to receive an image taken by the receiving-side information terminal 100.

Next, detailed configuration of each information terminal 100 will be described. As illustrated in FIG. 2, each information terminal 100 includes a controller 102, a program ROM (Read Only Memory) 104, a work RAM (Random Access Memory) 106, a flash ROM 108, a wireless communication processor 110, an antenna 112, a CCD (Charge Coupled Device) 114, an image processor 118, a GPS (Global Positioning System) unit 122, a speaker 124, a driver 126, a display 128 and a touch panel 130.

The controller 102 includes, for example, a CPU (Central Processing Unit). The controller 102 controls various functions of each information terminal 100 by executing a program (for example, a program for performing processing in FIG. 5, which will be described later) stored in the program ROM 104.

The program ROM 104 stores a program, as described above.

The work RAM 106 temporarily stores various pieces of information while software processing according to a program is performed.

The flash ROM 108 stores an after-mentioned table on which the tag ID is registered.

The wireless communication processor 110 includes, for example, a Radio Frequency (RF) circuit, a Base Band (BB) circuit, or the like. The wireless communication processor 110 transmits and receives a wireless signal via the antenna 112. Further, the wireless communication processor 110 encodes and modulates a signal to be transmitted, and demodulates and decodes a received signal.

The CCD 114 is disposed on, for example, a surface opposite to a surface on which the display 128 is disposed, of a housing of each information terminal 100. The CCD 114 takes successively an image of light incident via an unillustrated lens, converts an image signal obtained by taking the image to digital data, thereby generating digital data (a frame).

The image processor 118 adjusts the image quality and image size of a frame successively outputted from the CCD 114 to be outputted to the controller 102 so that the display 128 can display a live view image of the frame.

The GPS unit 122 receives signals from GPS satellites, and measures a position of each information terminal 100 on the basis of the signals. The position is represented by a latitude and longitude. Further, the GPS unit 122 outputs information indicating the measured position to the controller 102.

The speaker 124 outputs sound such as alarm on the basis of audio data from the controller 102.

The driver 126 outputs an image signal based on image data outputted from the controller 102 to the display 128.

The display 128 includes, for example, an LCD (Liquid Crystal Display), a PDP (Plasma Display Panel), an EL (Electroluminescence) display or the like. The display 128 displays an image (for example, an after-mentioned marker image, a live view image taken successively by the CCD 114 or the like) according to the image signal outputted from the driver 126.

The touch panel 130 is an interface that is disposed on the upper surface of the display 128 and is used by each user 400 for inputting various instructions. The touch panel 130 has, for example, an unillustrated built-in transparent electrode, and when a finger or the like of each user 400 touches the touch panel 130, a position where a voltage changes is detected as a touch position, and information of the touch position is outputted to the controller 102.

Figure 3:
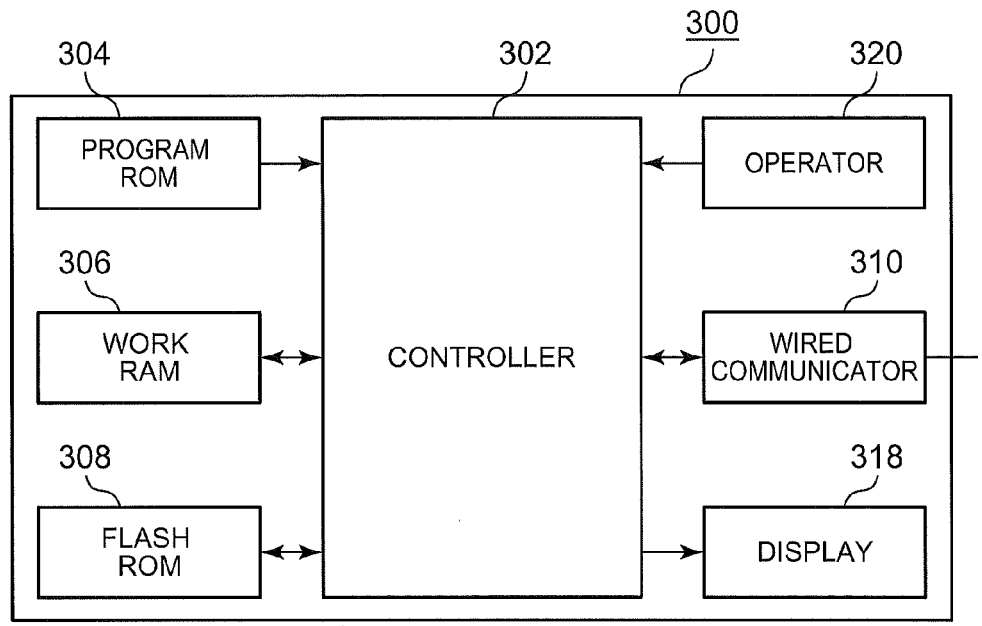
FIG. 3 is a diagram illustrating one example of configuration of a management server according to the first embodiment.

Next, detailed configuration of the management server 300 will be described. As illustrated in FIG. 3, the management server 300 includes a controller 302, a program ROM 304, a work RAM 306, a flash ROM 308, a wired communicator 310, a display 318 and an operator 320.

The controller 302 includes, for example, a CPU. The controller 302 controls various functions of the management server 300 by executing software processing according to a program (for example, a program for performing processing in FIG. 5, which will be described later) stored in the program ROM 304.

The program ROM 304 stores a program, as described above.

The work RAM 306 temporarily stores various pieces of information while software processing is performed according to a program.

The flash ROM 308 stores after-mentioned database.

The wired communicator 310 communicates with each information terminal 100 via the communication network 500 and wireless base station 600.

The display 318 displays various types of images.

The operator 320 is an interface that includes a keyboard and/or the like and is used by a user for inputting various instructions.

Figure 4:
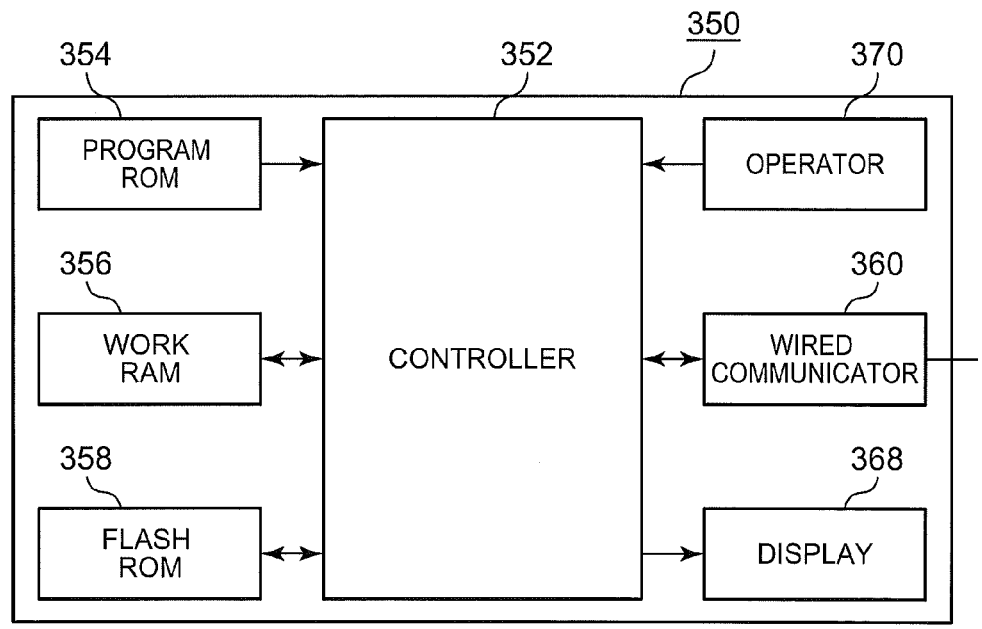
FIG. 4 is a diagram illustrating one example of configuration of an image distribution server according to the first embodiment.

Next, detailed configuration of the image distribution server 350 will be described. As illustrated in FIG. 4, the image distribution server 350 includes a controller 352, a program ROM 354, a work RAM 356, a flash ROM 358, a wired communicator 360, a display 368 and an operator 370. The configuration of the image distribution server 350 is the same as the above configuration of the management server 300, and therefore detailed description of the configuration will not be described.

Next, operation of the communication system 1 according to the first embodiment will be described with reference to a flow chart in FIG. 5. In the present embodiment, a case in which a transmission-side information terminal is the information terminal 100-1 and a receiving-side information terminal is the information terminal 100-2 will be described, as an example.

The controller 102 in the transmission-side information terminal 100-1 transmits the tag ID request information to the management server 300 via the wireless communication processor 110 and antenna 112, the tag ID request information including the content, and the area number indicating the position of the transmission-side information terminal 100-1.

The controller 102 identifies the area number on the basis of position information measured by the GPS unit 122.

The controller 302 in the management server 300 controls the wired communicator 310 to receive the tag ID request information (Step S100).

The controller 302 in the management server 300 assigns the tag ID according to the received tag ID request information.

Next, the controller 302 registers the assigned tag ID, the content in the received tag ID request information and the area number in association with one another in database in the flash ROM 308 (Step S101).

Figures 6, 7:
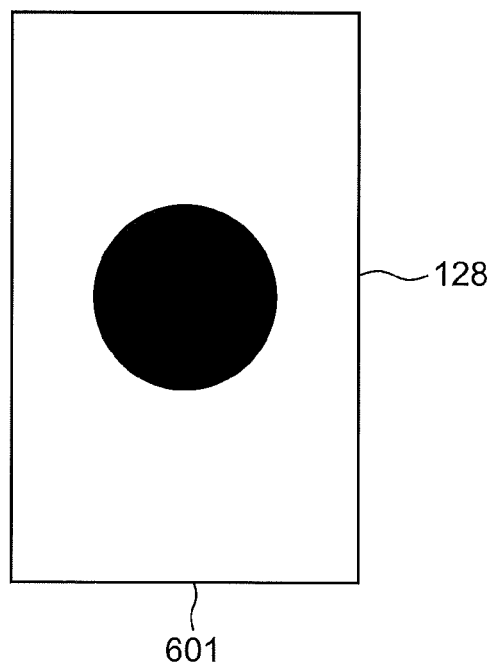
FIG. 6 is a diagram illustrating one example of database in a management server according to the first embodiment.
FIG. 7 is a diagram illustrating one example of display of a marker image by a transmission-side information terminal according to the first embodiment.

FIG. 6 is a diagram illustrating one example of database in the flash ROM 308. As illustrated in FIG. 6, the tag ID, the area number and the content are registered in association with one another. An imaging control code will be described later in an after-mentioned second embodiment.

The controller 302 in the management server 300 controls the wired communicator 310 to transmit the tag ID to the transmission-side information terminal 100-1.

The controller 102 in the transmission-side information terminal 100-1 receives the tag ID via the antenna 112 and wireless communication processor 110 (Step S103).

The controller 102 in the transmission-side information terminal 100-1 converts the received tag ID to marker information indicating the marker that change its color with time. For example, the controller 102 encodes the tag ID to a bit data array and performs digital modulation based on the bit data array to generate the marker information indicating the marker that changes its color with time.

Next, the controller 102 outputs the marker information indicating the marker that changes its color with time to the driver 126.

The driver 126 outputs an image signal based on the marker information outputted from the controller 102 to the display 128.

The display 128 displays a marker image that corresponds to the inputted image signal and changes its color with time (Step S103).

FIG. 7 is a diagram illustrating one example of a marker image 601 displayed on the display 128. Any size, display position, shape and design of the marker image 601 can be employed.

The controller 102 in the receiving-side information terminal 100-2 takes an image of the marker to acquire the tag ID and the area number, and performs query processing to the management server 300 (Step S104).

Specifically, in response to an operation instruction from the user 400, the controller 102 controls the CCD 114 to take successively an image so as to include the marker image displayed on the display 128 in the transmission-side information terminal 100-1 in the image taken by the CCD 114. This causes visible light communication to be performed between the transmission-side information terminal 100-1 and the receiving-side information terminal 100-2, allowing for transmitting and receiving the tag ID.

FIG. 8 is a diagram illustrating one example of an image taken by the receiving-side information terminal 100-2. In the example in FIG. 8, the taken image includes users 400-1(1) and 400-1(2), two information terminals 100-1(1) and 100-1(2) and marker images 601 and 602 that are displayed on these information terminals 100-1(1) and 100-1(2), respectively.

Further, the controller 102 analyzes image data acquired by taking an image to acquire the tag ID on the basis of color change of the marker. That is, the controller 102 decodes the marker image in the image data to a bit data array to acquire the tag ID.

The controller 102 also identifies the area number on the basis of position information measured by the GPS unit 122.

Further, the controller 102 generates query information including the tag ID and the area number.

If a taken image includes a plurality of marker images as illustrated in FIG. 8 and a plurality of tag IDs are acquired, the controller 102 associates a position of each of the markers in the taken image with each of the tag IDs. Further, the controller 102 generates query information for each of the plurality of tag IDs.

Next, the controller 102 in the receiving-side information terminal 100-2 transmits the query information to the management server 300 via the wireless communication processor 110 and antenna 112.

If a plurality of pieces of query information are generated for relative tag IDs at Step S104, the controller 102 in the receiving-side information terminal 100-2 transmits the plurality of pieces of query information to the management server 300.

The controller 302 in the management server 300 receives the query information from the receiving-side information terminal 100-2 via the wired communicator 310 (Step S105).

Next, the controller 302 in the management server 300 performs information providing processing (Step S106).

Specifically, the controller 302 searches database in the flash ROM 308 by the tag ID and the area number in the received query information as a key to acquire the content associated with the tag ID and the area number.

Further, the controller 302 generates result list information that includes the acquired content and the tag ID associated with the content.

If a plurality of pieces of query information for relative tag IDs are received at Step S105, the controller 302 in the management server 300 generates the result list information for each query information.

Next, the controller 302 in the management server 300 transmits the result list information to the receiving-side information terminal 100-2 via the wired communicator 310.

The controller 102 in the receiving-side information terminal 100-2 receives the result list information via the antenna 112 and wireless communication processor 110 (Step S107).

Next, the controller 102 in the receiving-side information terminal 100-2 generates image data in which a computer graphics image of content included in the received result list information is combined at a position of the marker in the image taken at Step S104 and outputs the generated image data to the driver 126.

The driver 126 outputs an image signal based on the image data outputted from the controller 102 to the display 128. The display 128 displays an image corresponding to the inputted image signal (Step S108).

Here, the controller 102 performs image synthesis processing according to processing information. The processing information may be stored in the flash ROM 108 or obtained from outside.

If the image taken at Step S104 includes a plurality of marker images, a plurality of pieces of query information are transmitted at Step S105 and a plurality of pieces of result list information are received at Step S107. In this case, the controller 102 combines a computer graphics image of content included in each of the pieces of result list information on the basis of a position of the marker associated with the tag ID included in the result list information in the taken image.

Next, the controller 102 in the receiving-side information terminal 100-2 generates storage instruction information that includes the tag ID included in the result list information, the area number indicating a position in the receiving-side information terminal 100-2 and the image data of a synthetic image displayed at Step S108.

If the controller 102 in the receiving-side information terminal 100-2 receives a plurality of pieces of result list information at Step S107, the controller 102 in the receiving-side information terminal 100-2 generates the storage instruction information for each result list information.

Further, the controller 102 transmits the storage instruction information to the image distribution server 350 via the wireless communication processor 110 and antenna 112. The controller 352 in the image distribution server 350 receives the storage instruction information via the wired communicator 360 (Step S110).

Next, the controller 352 in the image distribution server 350 registers, in a storing position (address) of database in the flash ROM 358 that corresponds to the storing position of the tag ID in the received storage instruction information, the tag ID, the area number and the image data of the storage instruction information in association with one another (Step S111).

FIG. 9 is a diagram illustrating one example of database in the flash ROM 308. As illustrated in FIG. 9, the tag ID, the area number and the image data are registered in association with one another.

The controller 102 in the transmission-side information terminal 100-1 periodically performs query processing for acquiring an image taken by the receiving-side information terminal 100-2, and performs query processing after the above processing at Step S111 (Step S112).

Specifically, the controller 102 in transmission-side information terminal 100-1 generates the query information that includes the tag ID received at Step S102 and the area number indicating the position of the transmission-side information terminal 100-1.

Next, the controller 102 in the transmission-side information terminal 100-1 transmits the generated query information to the image distribution server 350 via the wireless communication processor 110 and antenna 112.

The controller 352 in the image distribution server 350 receives the query information via the wired communicator 360 (Step S113).

Next, the controller 352 in the image distribution server 350 searches database in the flash ROM 358 by the tag ID and the area number that are included in the received query information as a key to acquire image data associated with the tag ID and area number (Step S114).

Next, the controller 352 in the image distribution server 350 transmits search result information including the acquired image data to the transmission-side information terminal 100-1 via the wired communicator 360.

The controller 102 in the transmission-side information terminal 100-1 receives the search result information via the antenna 112 and wireless communication processor 110 (Step S115).

The controller 102 in the transmission-side information terminal 100-1 outputs the image data in the search result information to the driver 126.

The driver 126 outputs an image signal based on the image data outputted from the controller 102 to the display 128.

The display 128 displays an image corresponding to the inputted image signal (Step S116).

Figure 10:
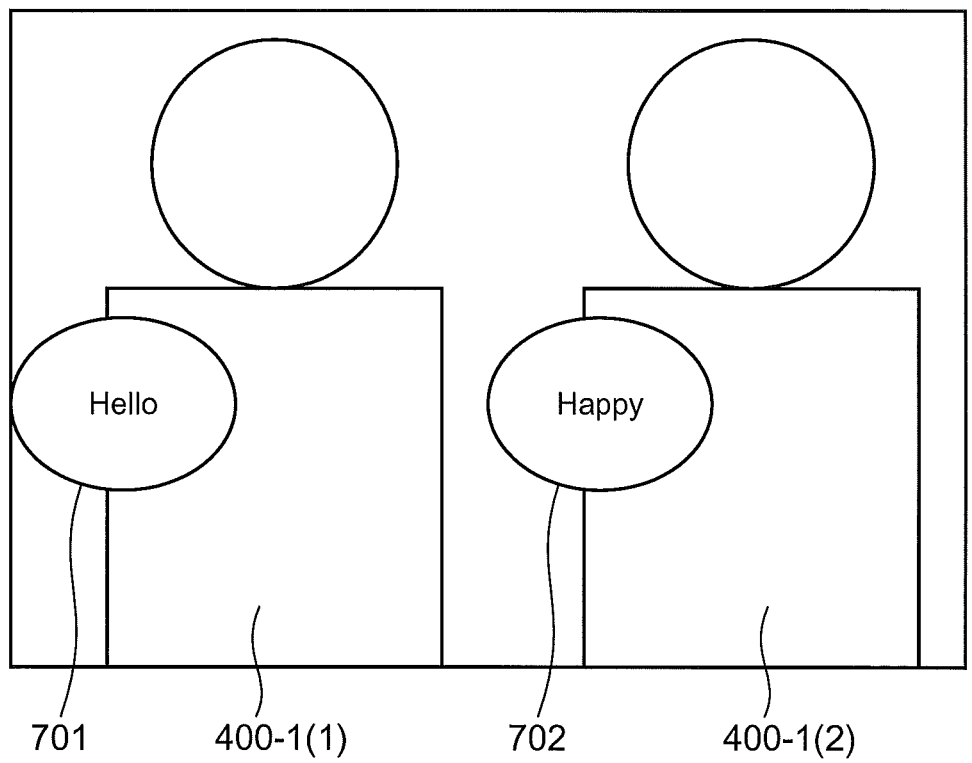
FIG. 10 is a diagram illustrating one example of an image displayed by a transmission-side information terminal according to the first embodiment.

FIG. 10 is a diagram illustrating one example of an image displayed by the transmission-side information terminal 100-1. In FIG. 10, a taken image includes the user 400-1(1) and the user 400-1(2), and a computer graphics image 701 of content and a computer graphics image 702 of content are combined on positions of marker images displayed by two information terminals 100-1(1) and 100-1(2).

In the first embodiment, on receiving the tag ID that is information identifying an image data storing position from the management server 300, the transmission-side information terminal 100 displays the marker image that changes its wavelength with time, on the basis of the tag ID. The receiving-side information terminal 100 takes an image of the transmission-side information terminal 100 to acquire the tag ID from light of the marker displayed by the transmission-side information terminal 100. Further, the receiving-side information terminal 100 transmits the storage instruction information to the image distribution server 350, the storage instruction information including the acquired tag ID, the area number indicating the position of the receiving-side information terminal 100 and the image data of the taken image. The image distribution server 350 stores the tag ID, the area number and the image data in the storage instruction information in association with one another in database.

Meanwhile, the transmission-side information terminal 100-1 transmits the query information to the image distribution server 350, the query information including the tag ID acquired from the management server 300 and the area number indicating the position of the receiving-side information terminal 100-2. Then, the transmission-side information terminal 100-1 acquires image data (image data representing an image taken by the receiving-side information terminal 100) associated with the tag ID and the area number of the query information from the image distribution server 350.

That is, when the receiving-side information terminal 100-2 takes successively the marker image of the transmission-side information terminal 100-1 to acquire the tag ID, the transmission-side information terminal 100-1 can acquire image data (image data acquired by imaging by the receiving-side information terminal 100) associated with the tag ID. Accordingly, since, unlike a conventional method, a taken image does not need to include a facial image, and a clear facial image is not required for image matching processing either, an image can be distributed from a photographer of a photograph to a person to be photographed more easily and reliably.

Second embodiment

In a second embodiment, an imaging control code for controlling imaging by the receiving-side information terminal 100 is used instead of content in the first embodiment.

A configuration of the communication system 1, a configuration of the information terminal 100, a configuration of the management server 300 and a configuration of the image distribution server 350 in the second embodiment are the same as those in the first embodiment in FIGS. 1 to 4, and therefore will not be described.

Hereinafter, operation of the communication system 1 in the second embodiment will be described with reference to the flow chart in FIG. 11. In the present embodiment, a case in which the transmission-side information terminal is the information terminal 100-1 and the receiving-side information terminal is the information terminal 100-2 will be described as an example.

The controller 102 in the transmission-side information terminal 100-1 the transmits tag ID request information to the management server 300 via the wireless communication processor 110 and antenna 112, the tag ID request information including the imaging control code for controlling imaging by the receiving-side information terminal 100 and the area number indicating the position of the transmission-side information terminal 100-1.

The controller 302 in the management server 300 receives the tag request information via the wired communicator 310 (Step S200). For example, the imaging control code is a predetermined code for causing the receiving-side information terminal 100-2 to perform auto shutter function, zoom function and the like.

The controller 302 in the management server 300 assigns a tag ID in response to the received tag ID request information. Next, the controller 302 registers the assigned tag ID, the imaging control code in the received tag request information, and area number in association with one another in database in the flash ROM 308 (Step S201).

Figure 5:
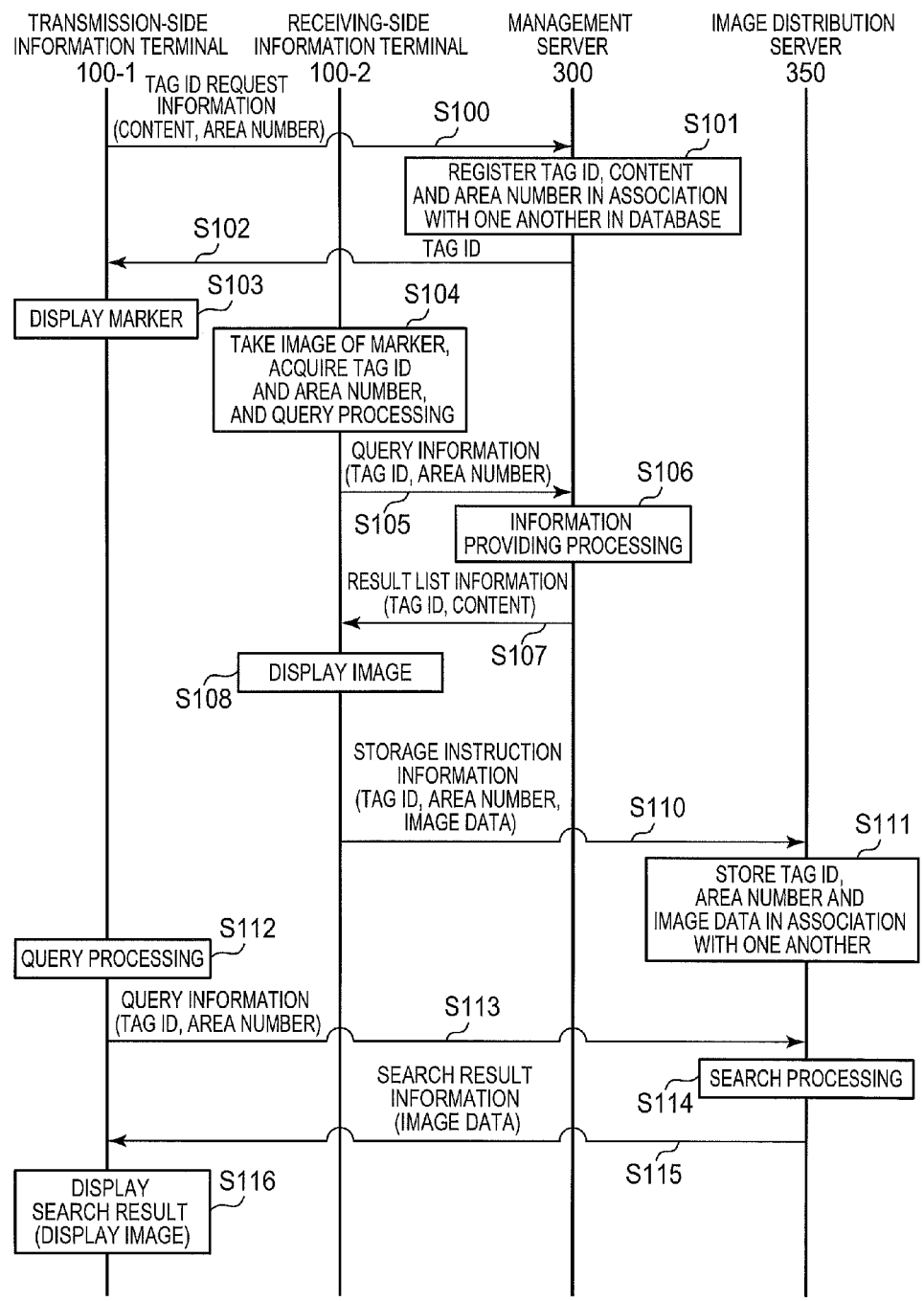
FIG. 5 is a flow chart illustrating one example of operation according to the first embodiment.

Operation from Step S202 to Step S205 is the same as that from Step S102 to Step S105 in FIG. 5, and therefore will not be described.

Next, the controller 302 in the management server 300 performs information providing processing (Step S206). Specifically, the controller 302 searches database in the flash ROM 308 by the tag ID and the area number in the received query information as a key to acquire the imaging control code associated with the tag ID and the area number. Further, the controller 302 generates result list information that includes the acquired imaging control code and the tag ID associated with the imaging control code.

Next, the controller 302 in the management server 300 transmits the result list information to the receiving-side information terminal 100-2 via the wired communicator 310.

The controller 102 in the receiving-side information terminal 100-2 receives the result list information via the antenna 112 and wireless communication processor 110 (Step S207).

Next, the controller 102 in the receiving-side information terminal 100-2 controls the CCD 114 according to the imaging control code included in the result list information. The CCD 114 takes an image according to the control by the controller 102 (Step S208).

Next, if the imaging control code instructs recording of image data, the controller 102 in the receiving-side information terminal 100-2 stores image data acquired by imaging by the CCD 114 at Step S208 in the flash ROM 108 and/or the like (Step S209).

Next, the controller 102 in the receiving-side information terminal 100-2 generates the storage instruction information that includes the tag ID included in the result list information, the area number indicating the position in the receiving-side information terminal 100-2 and the image data obtained by taking an image at Step S208.

Further, the controller 102 transmits the storage instruction information to the image distribution server 350 via the wireless communication processor 110 and antenna 112.

The controller 352 in the image distribution server 350 receives the storage instruction information via the wired communicator 360 (Step S210).

Operation from Step S211 to Step S216 after that is the same as operation from Step S111 to Step S116 in FIG. 5, and therefore will not be described.

In the second embodiment, like the first embodiment, when the receiving-side information terminal 100-2 takes successively an image of the marker image displayed on the transmission-side information terminal 100-1 to acquire the tag ID, the transmission-side information terminal 100-1 is able to obtain image data associated with the tag ID (image data acquired by imaging by the receiving-side information terminal 100-2). Accordingly, unlike a conventional method, a taken image does not need to include a facial image, and a clear facial image is not required for image matching processing, either, thereby increasing reliability of image distribution.

Further, in the second embodiment, the transmission-side information terminal 100-1 transmits the imaging control code to the receiving-side information terminal 100-2 via the management server 300, thereby controlling imaging processing by the receiving-side information terminal 100-2. Therefore, the transmission-side information terminal 100-1 is able to control the receiving-side information terminal 100-2 to take an image of the marker image more reliably, thereby further increasing reliability of image distribution.

The present invention is not limited by the above description of embodiments and drawings, and the above embodiments and drawings can be properly changed.

For example, in the above embodiments, the receiving-side information terminal 100-2 performs combining a content image on a taken image. However, the receiving-side information terminal 100-2 may transmit the storage instruction information including the content to be combined to the image distribution server 350, and the image distribution server 350 may combine the content on an image taken by the receiving-side information terminal 100-2.

The transmission-side information terminal 100-1 may transmit the tag ID request information that further includes a control instruction to the image distribution server 350 to the management server 300, and the management server 300 may transmit the control instruction information to the image distribution server 350. In this case, the image distribution server 350 is able to distribute an image to the transmission-side information terminal 100 according to the control instruction.

The image distribution server 350 may register an e-mail address of the user 400 of the transmission-side information terminal 100-1 and transmit image data as data attached to an e-mail.

In the first embodiment the content is used, and in the second embodiment the imaging control code is used. The present invention can be also applied to a case in which both of the content and the imaging control code are used.

In addition, for example, by a computer's executing a program, functions of the information terminal 100, management server 300 and image distribution server 350 may be realized. A program for realizing functions of the information terminal 100, management server 300 and image distribution server 350 may be stored in a recording medium such as CD-ROM, or may be downloaded to a computer via a network.

Preferred embodiments of the present invention have been described, but the present invention is not limited to the above specific embodiments. The present invention includes the inventions set forth in claims and their equivalents.

As explained above, the respective embodiments allows for easier and more reliable distribution of an image.

What is claimed is:

1. A communication system comprising a first information terminal and a second information terminal, the first information terminal being configured to access an information resource that is on a predetermined network and whose storing position is identified by definition information, the definition information defining a time-series change of a marker,
wherein the first information terminal comprises:
a first definition information acquirer configured to connect to a server that manages the definition information in the predetermined network, and to acquire the definition information;
a setter configured to set a use of the definition information acquired by the first definition information acquirer; and
an output device configured to output the marker that changes with time based on the definition information, the use of which was set by the setter, and
wherein the second information terminal comprises:
an imager;
a second definition information acquirer configured to acquire the definition information by causing the imager to sequentially take an image that includes the marker outputted by the output device in an imaged area; and
a transmitter configured to transmit image data in which the marker is included in the imaged area to the storing position identified by the definition information acquired by the second definition information acquirer;
wherein the first information terminal further comprises:
an image acquirer configured to acquire the image data in which the marker is included in the imaged area from the storing position after the transmission of the image data by the transmitter; and
a display configured to display the image data acquired by the image acquirer.

2. The communication system according to claim 1, wherein processing information for processing the image data in which the marker is included in the imaged area is associated with the definition information, and
wherein the image acquirer is configured to acquire the image data which is processed based on the processing information.

3. The communication system according to claim 2, wherein the processing information is information for processing an image region corresponding to an image position of the marker in the image data in which the marker is included in the imaged area.

4. The communication system according to claim 1, wherein imaging control information for controlling an imaging operation of the imager is associated with the definition information, and
wherein the second information terminal further comprises:
a control information acquirer configured to acquire the imaging control information from a storing position at which the imaging control information is stored based on the definition information acquired by the second definition information acquirer; and
an imaging controller configured to control the imaging operation of the imager based on the imaging control information acquired by the control information acquirer.

5. The communication system according to claim 4, wherein the imaging control information comprises recording instruction information for instructing recording of the image data in which the marker is included in the imaged area, and
wherein the transmitter transmits the image data in which the marker is included in the imaged area which is recorded in response to the recording instruction information.

6. An information terminal that accesses an information resource that is on a predetermined network and whose storing position is identified by definition information defining a time-series change of a marker, the information terminal comprising:
an imager;
a definition information acquirer configured to acquire the definition information by causing the imager to sequentially take an image that includes the marker outputted by another information terminal in an imaged area; and
a transmitter configured to transmit the image data in which the marker is included in the imaged area to the storing position identified by the definition information acquired by the definition information acquirer,
wherein the information terminal is operable in the predetermined network with the another information terminal, which comprises (i) a second definition information acquirer configured to connect to a server that manages the definition information in the predetermined network, and to acquire the definition information, (ii) a setter configured to set a use of the definition information acquired by the second definition information acquirer, (iii) an output device configured to output the marker that changes with time based on the definition information, (iv) an image acquirer configured to acquire the image data in which the marker is included in the imaged area from the storing position after the transmission of the image data by the transmitter, and (v) a display configured to display the image data acquired by the image acquirer.

7. The information terminal according to claim 6, wherein imaging control information for controlling an imaging operation of the imager is associated with the definition information; and
wherein the information terminal further comprises:
a control information acquirer configured to acquire the imaging control information from a storing position at which the imaging control information is stored based on the definition information acquired by the definition information acquirer; and
an imaging controller configured to control the imaging operation of the imager based on the imaging control information acquired by the control information acquirer.

8. The information terminal according to claim 7, wherein the imaging control information comprises recording instruction information for instructing recording of the image data in which the marker is included in the imaged area, and
wherein the transmitter transmits the image data in which the marker is included in the imaged area which is recorded in response to the recording instruction information.

9. A communication method for a communication system that comprises a first information terminal and a second information terminal, the first information terminal being configured to access an information resource that is on a predetermined network and whose storing position is identified by definition information defining a time-series change of a marker, the communication method comprising:
- a first definition information acquisition step at which the first information terminal connects to a server that manages the definition information in the predetermined network, and acquires the definition information;
- a setting step at which the first information terminal sets a use of the definition information acquired at the first definition information acquisition step;
- an output step at which the first information terminal outputs the marker that changes with time based on the definition information, the use of which is set at the setting step;
- an imaging step at which the second information terminal performs imaging;
- a second definition information acquisition step at which the second information terminal acquires the definition information by sequentially taking an image that includes the marker outputted at the output step in an imaged area;
- a transmission step at which the second information terminal transmits image data in which the marker is included in the imaged area to the storing position identified by the definition information acquired at the second definition information acquisition step;
- an acquiring step at which the first information terminal acquires the image data in which the marker is included in the imaged area from the storing position after the transmission of the image data at the transmission step; and
- a display step at which the first information terminal displays the acquired image data.

10. A non-transitory computer-readable information recording medium that has stored thereon a program, the program causing a computer that accesses an information resource that is on a predetermined network and whose storing position is identified by definition information that defines a time-series change of a marker to function as elements comprising:
- an imager;
- a definition information acquirer configured to acquire the definition information by causing the imager to sequentially take an image that includes the marker outputted by another computer in an imaged area; and
- a transmitter configured to transmit image data in which the marker is included in the imaged area to the storing position identified by the definition information acquired by the definition information acquirer;
- wherein the computer is operable in the predetermined network with the another computer, which is operable as (i) a second definition information acquirer configured to connect to a server that manages the definition information in the predetermined network, and to acquire the definition information, (ii) a setter configured to set a use of the definition information acquired by the second definition information acquirer, (iii) an output device configured to output the marker that changes with time based on the definition information, (iv) an image acquirer configured to acquire the image data in which the marker is included in the imaged area from the storing position after the transmission of the image data by the transmitter, and (v) a display configured to display the image data acquired by the image acquirer.

11. An information terminal configured to access an information resource that is on a predetermined network and whose storing position is identified by definition information, the definition information defining a time-series change of a marker, wherein the information terminal comprises:
- a definition information acquirer configured to connect to a server that manages the definition information in the predetermined network, and to acquire the definition information;
- a setter configured to set a use of the definition information acquired by the definition information acquirer; and
- an output device configured to output the marker that changes with time based on the definition information, the use of which was set by the setter, and
- an image acquirer configured to acquire image data in which the marker is included in an imaged area from the storing position, after images are sequentially taken of the output device of the information terminal and the image data in which the marker is included is transmitted to the storing position by a second information terminal; and
- a display configured to display the image data acquired by the image acquirer.

* * * * *